US010694065B2

(12) United States Patent
Janczyk et al.

(10) Patent No.: US 10,694,065 B2
(45) Date of Patent: Jun. 23, 2020

(54) MEDIA RAMP WITH FILM

(71) Applicant: Hewlett-Packard Development Company, L.P., Spring, TX (US)

(72) Inventors: Michael Janczyk, San Diego, CA (US); Shannon Lai, San Diego, CA (US); Ryan M Smith, San Diego, CA (US); Mikah Chou, New Taipei (TW)

(73) Assignee: Hewlett-Packard Development, L.P., Spring, TX (US)

( * ) Notice: Subject to any disclaimer, the term of this patent is extended or adjusted under 35 U.S.C. 154(b) by 0 days.

(21) Appl. No.: 16/331,277

(22) PCT Filed: Sep. 12, 2016

(86) PCT No.: PCT/US2016/051397
§ 371 (c)(1),
(2) Date: Mar. 7, 2019

(87) PCT Pub. No.: WO2018/048457
PCT Pub. Date: Mar. 15, 2018

(65) Prior Publication Data
US 2019/0356810 A1 Nov. 21, 2019

(51) Int. Cl.
*H04N 1/12* (2006.01)
(52) U.S. Cl.
CPC ........... *H04N 1/123* (2013.01); *H04N 1/1235* (2013.01)
(58) Field of Classification Search
CPC ............ H04N 1/0057; H04N 1/00588; H04N 1/00591; H04N 1/00602; H04N 1/00628; H04N 1/00631; H04N 1/1215; H04N 1/123; H04N 1/193; H04N 2201/0081; H04N 5/369; H04N 5/3745; H04N 5/232122; H04N 5/36961; H04N 5/374; H04N 9/04551; G02F 1/133345; G02F 1/1368; G02F 1/134309; G02F 1/136286; G02F 1/133514; G02F 1/1345; G02F 1/136227; G02F 2201/121; G02F 1/13306; G02F 1/133512; G02F 1/1339; G02F 1/13439;
(Continued)

(56) References Cited

U.S. PATENT DOCUMENTS 4,921,239 A 5/1990 Okui et al.
6,830,401 B1 * 12/2004 Hwang .................. B41J 13/106
347/104

(Continued)

FOREIGN PATENT DOCUMENTS

CN 1435990 A 8/2003
CN 1470958 A 1/2004
(Continued)

*Primary Examiner* — Negussie Worku
(74) *Attorney, Agent, or Firm* — HP Inc. Patent Department

(57) ABSTRACT

Examples disclosed herein relate to a device including a media ramp, in examples, the device includes a scanner disposed in a scan zone to image a medium traveling across the scan zone; a transparent member disposed over the scan zone; a media ramp disposed adjacent to the scan zone to direct the medium to an exit; and a film element disposed underneath the transparent member and adjacent to the scan zone at a first end and disposed to extend over at least a portion of the media ramp at a second end.

15 Claims, 5 Drawing Sheets

(58) Field of Classification Search
CPC .......... G02F 1/13452; G02F 1/136213; G02F 2001/134372; G02F 2001/13685; G02F 2201/122; G02F 2201/123; G02F 1/13318; G02F 1/1333; G02F 1/133308; G02F 1/133377; G02F 1/1334; G02F 1/133528; G02F 1/133711; G02F 1/1341; G02F 1/1343; G02F 1/134363; G02F 1/1362; G02F 1/136204; G02F 1/13725; G02F 2001/13324; G02F 2001/133357; G02F 2001/133368; G02F 2001/133388; G02F 2001/133776; G02F 2001/134318; G02F 2001/13775; G02F 2202/104; G02F 2202/16; G02F 2202/22
USPC ........................................................ 358/474
See application file for complete search history.

(56) References Cited

U.S. PATENT DOCUMENTS

| | | | |
|---|---|---|---|
| 6,877,742 B2 | 4/2005 | Nishikata et al. | |
| 7,342,694 B2 | 3/2008 | Kusunose | |
| 8,072,655 B2* | 12/2011 | Park | H04N 1/121 358/474 |
| 8,395,827 B2 | 3/2013 | Sheng et al. | |
| 2003/0048480 A1* | 3/2003 | Hsu | H04N 1/0402 358/302 |
| 2003/0072039 A1* | 4/2003 | Liu | H04N 1/10 358/474 |
| 2004/0109207 A1 | 6/2004 | Mui et al. | |
| 2006/0044633 A1* | 3/2006 | Iwago | H04N 1/0057 358/498 |
| 2006/0158701 A1 | 7/2006 | Park et al. | |
| 2008/0067395 A1* | 3/2008 | Loew | H04N 3/38 250/393 |
| 2008/0278776 A1 | 11/2008 | Sheng et al. | |
| 2009/0241290 A1* | 10/2009 | Jones | B41J 3/4071 16/291 |
| 2009/0283964 A1* | 11/2009 | Smith | B65H 9/08 271/226 |
| 2010/0142013 A1* | 6/2010 | Park | H04N 1/121 358/498 |
| 2010/0207987 A1* | 8/2010 | Sano | B41J 2/2114 347/15 |

FOREIGN PATENT DOCUMENTS

| | | |
|---|---|---|
| CN | 101547276 A | 9/2009 |
| EP | 1335575 | 8/2003 |
| JP | 2003333277 A | 11/2003 |
| JP | 2004145021 A | 5/2004 |
| JP | 4690520 B2 | 6/2011 |
| RU | 41220 U1 | 10/2004 |

* cited by examiner

MEDIA RAMP WITH FILM

BACKGROUND

Imaging devices—including scanners, copiers, facsimile machines, multifunction printers, all-in-one devices, or other devices—convert physical objects (e.g., documents, photographs, etc.) into electronic data. In some examples, imaging devices can include an automatic document feeder (ADFs) to receive stacks of media to provide to a scanner subassembly for imaging. ADFs may utilize a transmission having a series of motors and rollers to transport the media between trays.

BRIEF DESCRIPTION OF THE DRAWINGS

The following detailed description references the drawings, wherein.

DETAILED DESCRIPTION

Figure 1:
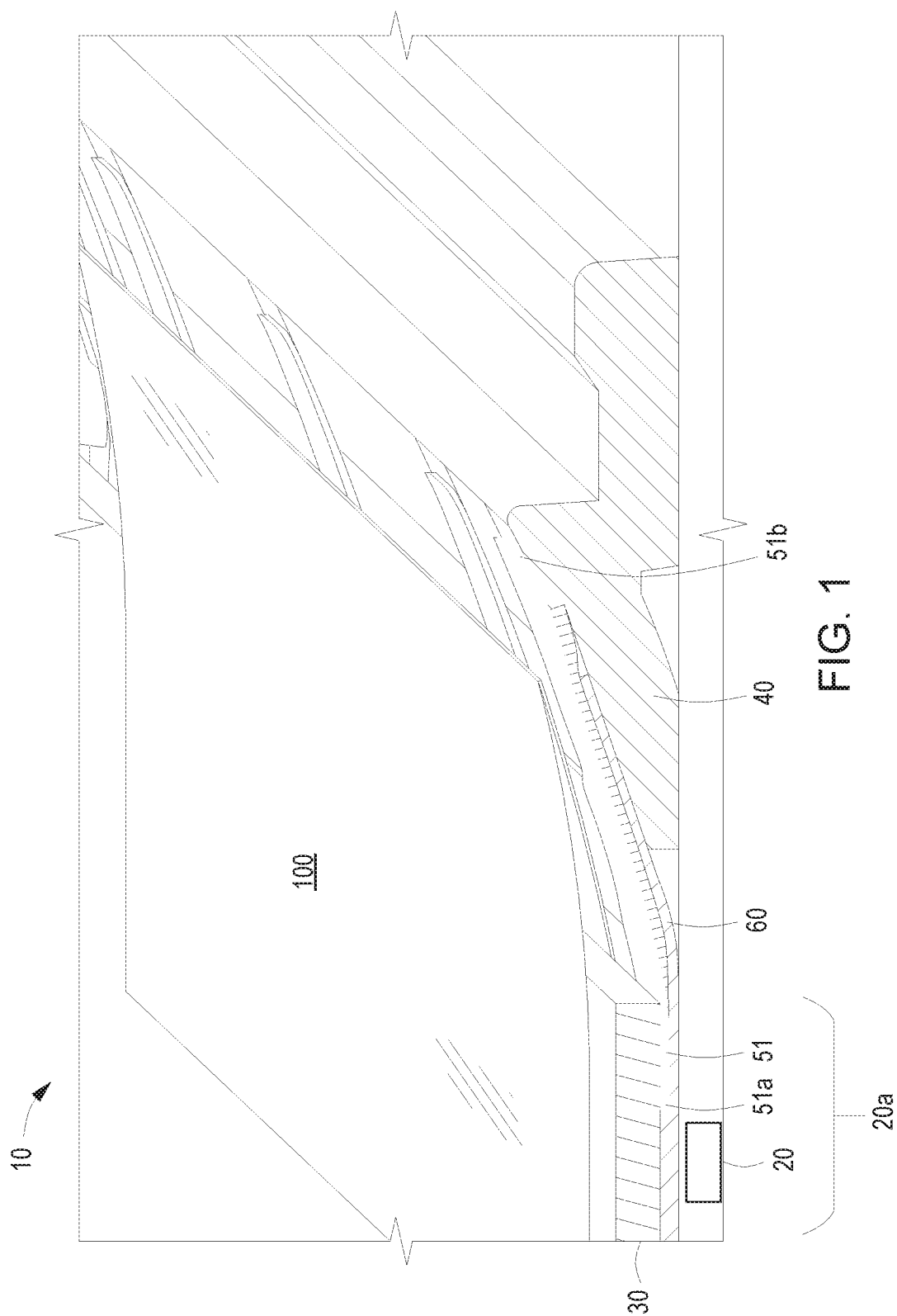
FIG. 1 is a partial schematic isometric view of a device according to an example.

An automatic document feeder (ADF) may be coupled to an imaging device to provide objects for scanning. An ADF may include an input tray to receive a stack of media for imaging and may transport the media stack through a scan zone to an output tray. To reduce ADF size, a number of ADFs stack the input tray and the output tray on top of each other to form a substantially "C" shaped media path. In such ADFs, the scan zone may contain a stationary scanner (e.g., a line scanner) to image a medium as it travels through the media path. The speed at which media travels past the scan zone should be kept constant when scanning the media. This may be achieved by ensuring smooth transitions through the "C" shaped media path. However, given the nature of the "C" shaped path, the media transitions in the path are not constant. When these transitions are not constant, a scanned image may have artifacts.

To address these issues, in the examples described herein, a device is described which includes film element disposed on a media ramp in the "C" shaped media path to reduce scan artifacts. The device includes a media ramp downstream of a scan zone along the media path to direct a medium to an exit. A film element may be disposed on the media ramp to form channels. The film element may be composed of a polyester material such as biaxially-oriented polyethylene terephthalate. In examples, the film elements may create transition zones on the media ramp to reduce the number of places at which a leading edge of a medium traveling along a media path encounters the media ramp. The transition zone may be disposed between film elements and may be zones in which a change in direction of a medium traveling over the media ramp may be smoothed out. In such examples, it has been found that scan artifacts have been reduced.

Accordingly, the present specification describes, in one example, a device that includes a scanner disposed in a scan zone to image a medium traveling across the scan zone; a transparent member disposed over the scan zone; a media ramp disposed adjacent to the scan zone to direct the medium to an exit; and a first film element disposed underneath the transparent member and adjacent to the scan zone at a first end and disposed to extend over at least a portion of the media ramp at a second end.

In another example, the present specification describes an imaging device that includes a scanner disposed in a scan zone to image a medium; a transparent member disposed over the scan zone; a media ramp disposed adjacent to the scan zone to guide the medium to an exit path; a first film element disposed underneath the transparent member and adjacent to the scan zone at a first end and disposed to extend over at least a portion of the media ramp at a second end; and a second film element spaced apart from the first film element to form a channel there between, the second film disposed underneath the transparent member and adjacent to the scan zone at a first end and disposed to extend over at least a portion of the media ramp at a second end.

In yet another example, the present specification describes an imaging device that includes a scanner disposed in a scan zone to image a medium; a transparent member disposed over the scan zone; a media ramp disposed adjacent to the scan zone to direct the medium to an exit path of an automatic document feeder; a first film element disposed underneath the transparent member and adjacent to the scan zone at a first end and disposed to extend over at least a portion of the media ramp at a second end; a second film element spaced apart from the first film element to form a channel there between, the second film disposed underneath the transparent member and adjacent to the scan zone at a first end and disposed to extend over at least a portion of the media ramp at a second end; and a calibration label disposed over the scan zone and underneath the transparent member and disposed to extend over at least a portion of the media ramp, the first end of the first film element and the first end of the second film element are disposed inside the calibration label.

Figure 2:
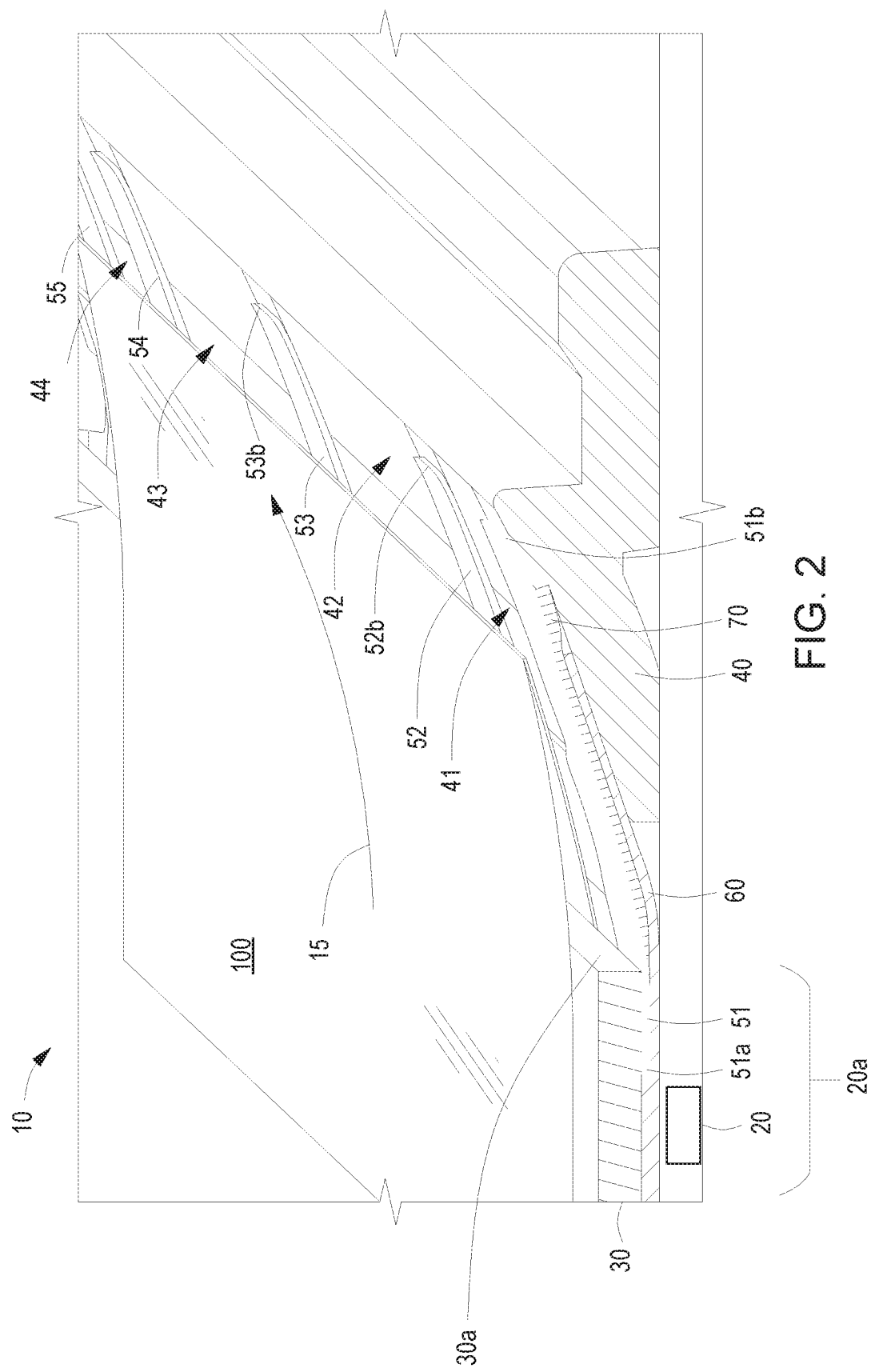
FIG. 2 is a partial schematic isometric view of the device of FIG. 1 according to an example.
Figure 3:
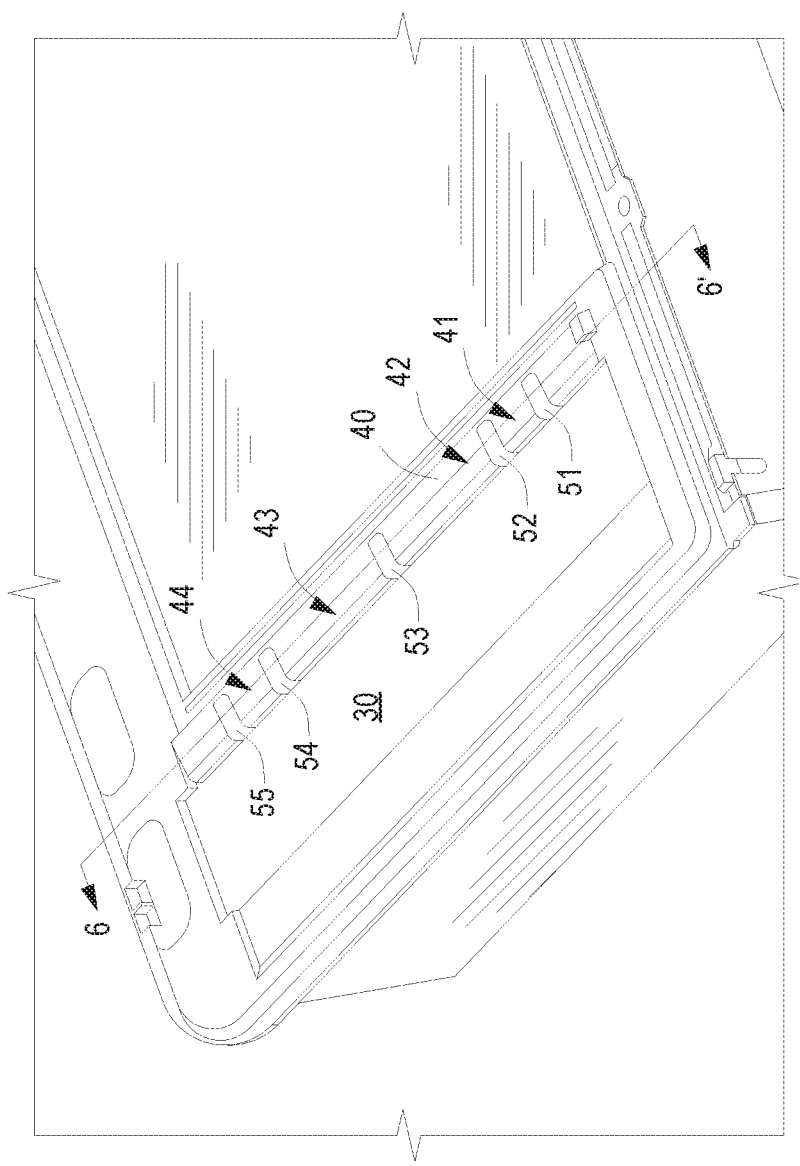
FIG. 3 is a partial schematic isometric view of the device of FIG. 1 according to an example.
Figure 4:
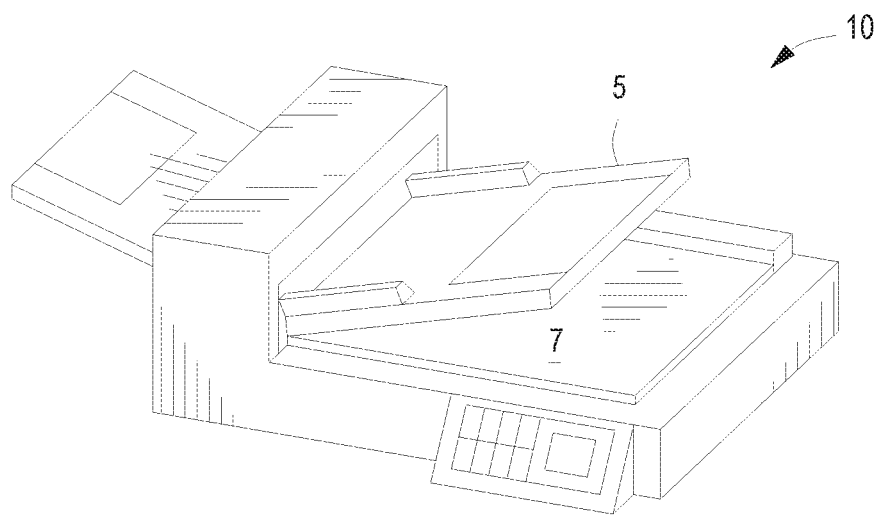
FIG. 4 is a schematic isometric view of the device of FIG. 1 according to an example.
Figure 5:
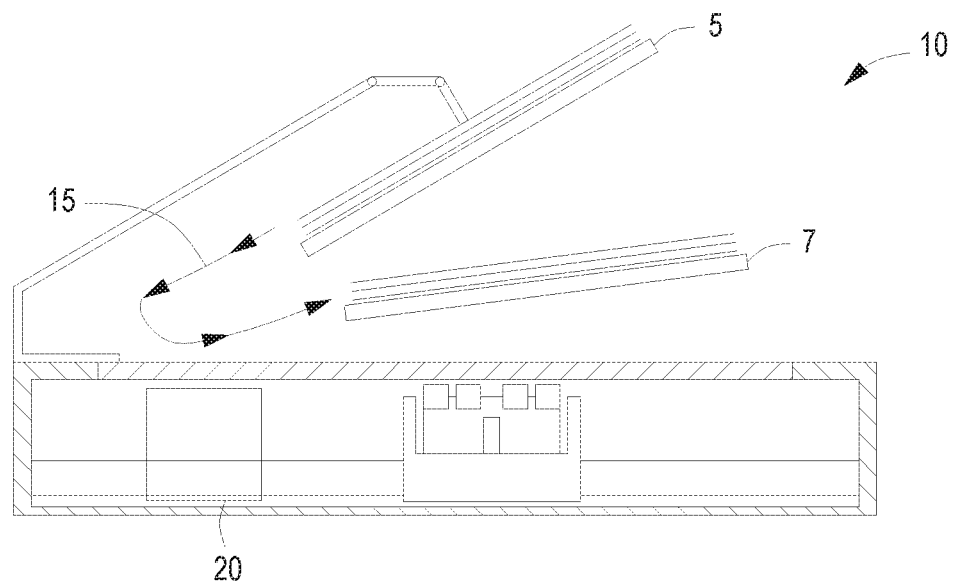
FIG. 5 is a partial schematic view of the device of FIG. 1 according to an example.

Referring now to the drawings, FIG. 1 is a partial schematic isometric view of a device 10 according to an example. FIG. 2 is a partial schematic isometric view of device 10 of FIG. 1 according to an example. FIG. 3 is a partial schematic isometric view of device 10 of FIG. 1 according to an example. FIG. 4 is a schematic view of device 10 of FIG. 1 according to an example. FIG. 5 is a partial schematic view of device 10 of FIG. 1 according to an example. The example device 10 includes a scanner 20, a transparent member 30, a media ramp 40, and film element 51. In examples, device 10 further include a calibration label 60 and an adhesive layer 70. In examples, a medium traveling through device 10 may travel along a media path 15 from an input tray 5 towards an output tray 7. In examples, media path 15 may be a generally "C" shaped media path.

In examples, device 10 may be any imaging device to transport media along a "C" shaped media path. An "imaging device" may be a hardware device, such as a scanner, copier, multifunction printer (MFP), or any other device with functionalities to produce electronic data representing physical objects. In some examples, an MFP may be capable of performing a combination of multiple different functionalities such as, for example, printing, photocopying, scanning, faxing, etc. In examples, media may be any type of paper, photopolymers, thermopolymers, plastics, fabric, composite, metal, wood, etc., which may be stacked on a input tray 5 of device 10.

In examples, device 10 may provide media to travel along media path 15 to be imaged by scanner 20. In examples, media path 15 may be a media path to transport media from input tray 5 to output tray 7. In examples, a medium traveling along media path 15 would traverse a scan zone 20*a* and travel up media ramp 40 to exit device 10. In examples, given the nature of the "C" shaped path, the media transitions in the path are may not be constant. In examples, when these transitions are not constant, the scanned image may have artifacts. In the examples described herein, the transition from a scan zone 20*a* to media ramp 40 may be improved to reduce scan artifacts.

In examples, scanner 20 may be a hardware component to scan a physical object to produce electronic representations of the object. In examples, scanner 20 may scan or image a variety of physical objects placed in a scan zone of the scanner. In examples, scanner 20 may traverse the scan zone to image an object. In other examples, scanner 20 may remain stationary and an object may travel along a scan zone of scanner 20 for imaging. In the example of FIG. 1, scanner 20 may be disposed in scan zone 20*a*. In the examples of FIGS. 1-6, scan zone 20*a* may be the scan zone of a stationary scanner 20 to image a medium (e.g., a document) traversing across the scan zone along a "C" shaped media path 15.

In examples, a transparent member 30 may be disposed to cover scan zone 20*a*. In examples, transparent member 30 may be composed of any ridged transparent material with structural integrity to support an object being imaged. In examples, transparent member 30 may be a glass, a plexi-glass, a transparent plastic, etc.

In examples, device 10 may include a calibration label 60 disposed below the transparent ember 30 and above scanner 20. In examples, calibration label 60 may extend over a portion of media ramp 40. In such examples, calibration label 60 may be coupled to transparent member 30 and extend beyond a first edge 30*a* of transparent member 30 to be disposed on at least a portion of media ramp 40. In the following discussion and in the claims, the term "couple" or "couples" is intended to include suitable indirect and/or direct connections. Thus, if a first component is described as being coupled to a second component, that coupling may, for example, be: (1) through a direct electrical or mechanical connection, (2) through an indirect electrical or mechanical connection via other devices and connections, (3) through an optical electrical connection, (4) through a wireless electrical connection, and/or (5) another suitable coupling. The term "connect" or "connected" is intended to include suitable direct connections. In the example of FIGS. 1-6, calibration label 60 may include a notch or recess in which film 51 may be disposed at one end. In examples, calibration label 60 may be used to ensure consistent and high quality digital images of a medium. For example, different scanners, or the same scanner at different points in time, may scan media differently. In other words, a scanner response may differ between scan jobs. The calibration label 60 may be used to account for these variations to ensure a high quality digital image is produced. In examples, calibration label 60 may be a uniformly colored white strip that has a certain reflectance and is viewable by the scanner 20. In examples, during calibration, the scanner 20 captures an image of calibration label 60 and may use the image of calibration label 60 to compensate for variations in scanner 20 response. In examples, variations in scanner response may occur at a point in time distinct from scanning. For example, calibration may occur periodically between scan jobs, on power up, or before each scan job.

In the examples, film 51 may be disposed underneath transparent member 30. In such an example, film 51 may be disposed inside calibration label 60 at a first end 51*a*. In examples, film 51 may be disposed adjacent to scan zone 20*a* at first end 51*a* and disposed to extend over at least a portion of media ramp 40 along the direction of media path 15 at a second end 51*b*. In examples, film 51 may be disposed over at least a portion of media ramp 40 to receive a leading edge of medium 100 traveling along media path 15. In examples, film 51 may be a polyester film. In such examples, film 51 may be a biaxially-oriented polyethylene terephthalate. In examples, film 51 may be dimensioned to cover a portion of media ramp 40 leaving an uncovered portion. In examples, a majority of media ramp 40 may be uncovered. In examples, an adhesive layer 70 may be disposed between the calibration label 60 and the film 51 over media ramp 40. In some examples, adhesive layer 70 may extend beyond calibration label 60 on to media ramp 40 to couple film 51 to media ramp 40.

In examples, film 52 may be a film substantially similar to film 51. In examples, film 52 may be spaced apart from the film 51 to form a channel 41 there between. In examples, film 52 may be disposed adjacent to scan zone 20*a* at a first end (not shown) and disposed to extend over at least a portion of media ramp 40 along the direction of media path 15 at a second end 52*b*. In an example, film 52 may be disposed underneath transparent member 30 at the first end. In other examples, film 52 may be disposed adjacent to transparent member 30 at the first end. In examples, film 52 may be dimensioned to cover a portion of media ramp 40 leaving an uncovered portion. In examples, a majority of media ramp 40 may be uncovered. In some examples, adhesive layer 70 may be disposed to couple film 52 to calibration label 60 and media ramp 40 in a substantially similar manner as described above with respect to film 51.

In examples, film 53 may be a film substantially similar to film 52. In examples, film 53 may be spaced apart from the film 51 and film 52. In such an examples, film 53 may be disposed to form channel 42 between film 53 and film 52. In examples, film 53 may be disposed adjacent to scan zone 20*a* at a first end (not shown) and disposed to extend over at least a portion of media ramp 40 along the direction of media path 15 at a second end 53*b*. In an example, film 53 may be disposed underneath transparent member 30 at the first end. In other examples, film 53 may be disposed adjacent to transparent member 30 at the first end. In examples, film 53 may be dimensioned to cover a portion of media ramp 40 in a direction substantially perpendicular to media path 15. In examples, a majority of media ramp 40 perpendicular to media path 15 may be uncovered. In examples, a majority of media ramp 40 may be uncovered. In some examples, adhesive layer 70 may be disposed to couple film 53 to calibration label 60 and media ramp 40 in a substantially similar manner as described above with respect to film 51.

In examples, film 54 may be a film substantially similar to film 53. In examples, film 54 may be spaced apart from the film 51, film 52, and film 53. In such an examples, film 54 may be disposed to form channel 43 between film 54 and film 53. In examples, film 54 may be disposed adjacent to scan zone 20*a* at a first end (not shown) and disposed to extend over at least a portion of media ramp 40 along the direction of media path 15 at a second end 54*b*. In an example, film 54 may be disposed underneath transparent member 30 at the first end. In other examples, film 54 may be disposed adjacent to transparent member 30 at the first end. In examples, film 54 may be dimensioned to cover a portion of media ramp 40 in a direction substantially perpendicular to media path 15. In examples, a majority of media ramp 40 perpendicular to media path 15 may be uncovered. In examples, a majority of media ramp 40 may be uncovered. In some examples, adhesive layer 70 may be disposed to couple film 54 to calibration label 60 and media ramp 40 in a substantially similar manner as described above with respect to film 51.

In examples, film 55 may be a film substantially similar to film 54. In examples, film 55 may be spaced apart from the film 51, film 52, film 53, and film 54. In such an examples, film 55 may be disposed to form channel 44 between film 55 and film 54. In examples, film 55 may be disposed adjacent to scan zone 20a at a first end (not shown) and disposed to extend over at least a portion of media ramp 40 along the direction of media path 15 at a second end (not shown). In an example, film 55 may be disposed underneath transparent member 30 at the first end. In other examples, film 55 may be disposed adjacent to transparent member 30 at the first end. In examples, film 55 may be dimensioned to cover a portion of media ramp 40 in a direction substantially perpendicular to media path 15. In examples, a majority of media ramp 40 perpendicular to media path 15 may be uncovered. In examples, a majority of media ramp 40 may be uncovered. In some examples, adhesive layer 70 may be disposed to couple film 55 to calibration label 60 and media ramp 40 in a substantially similar manner as described above with respect to film 51.

Figure 6:
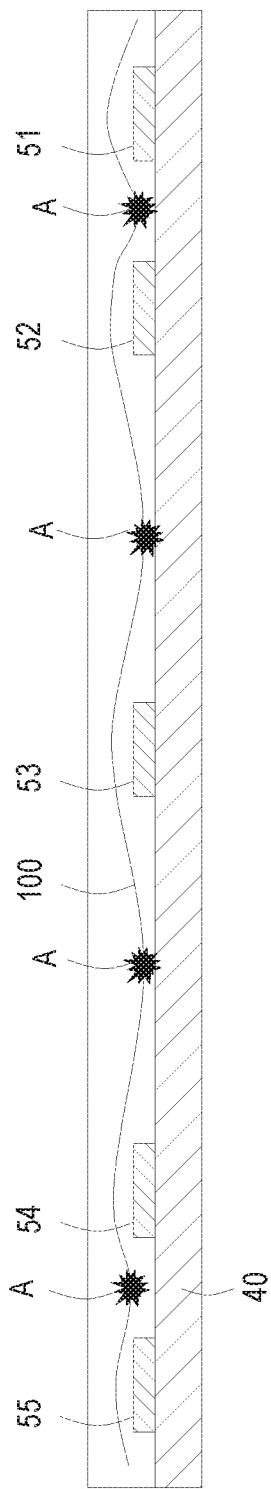
FIG. 6 is a cross-sectional view of the device of FIG. 3 taken along line 6-6' according to an example.

FIG. 6 is a cross-sectional view of the device of FIG. 3 taken along line 6-6' according to an example. In the example of FIG. 6, medium 100 is traveling along media path 15. In examples, device 10 may include one or more of film 51, film 52, film 53, film 54, and film 55. In an example with one film disposed over media ramp 40, it will be understood that the majority of the surface area of media ramp 40 adjacent to scan zone 20a will be bare of a film. Similarly, in other examples in which more than one film is disposed over ramp 40, the majority of the surface area of media ramp 40 adjacent to scan zone 20a will be bare of a film as depicted in FIG. 6. In the example of FIG. 6, a number of fluctuation points A are shown at which medium 100 contacts media ramp 40 after vibrations occur in medium 100 as it contacts film 51, film 52, film 53, film 54, and film 55. It will be understood that the number of fluctuation points A is reduced when a film is disposed over media ramp 40. In addition, it will be understood that the relative locations of film 51, film 52, film 53, film 54, and film 55 may impact the location and force applied to medium 100 to produce fluctuation points A.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be understood that the systems, apparatuses, and methods described herein can include various combinations and/or sub-combinations of the components and/or features of the different implementations described. Thus, features described with reference to one or more implementations can be combined with other implementations described herein.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A device, comprising:
a scanner disposed in a scan zone to image a medium traveling across the scan zone;
a transparent member disposed over the scan zone;
a media ramp disposed adjacent to the scan zone to direct the medium to an exit; and
a first film element disposed underneath the transparent member and adjacent to the scan zone at a first end and disposed to extend over at least a portion of the media ramp at a second end.

2. The device of claim 1, further comprising:
a second film element spaced apart from the first film element to form a channel there between, the second film disposed adjacent to the scan zone at a first end and disposed to extend over at least a portion of the media ramp at a second end.

3. The device of claim 2, further comprising:
a third film element spaced apart from the first element and the second film element, the third film disposed adjacent to the scan zone at a first end and disposed to extend over at least a portion of the media ramp at a second end.

4. The device of claim 1, further comprising:
a calibration label disposed over the scan zone and underneath the transparent member and disposed to extend over at least a portion of the media ramp, wherein the first end of the first film element is disposed inside the calibration label.

5. The device of claim 1, wherein the first film element is composed of a biaxially-oriented polyethylene terephthalate.

6. An imaging device, comprising:
a scanner disposed in a scan zone to image a medium;
a transparent member disposed over the scan zone;
a media ramp disposed adjacent to the scan zone to guide the medium to an exit path;
a first film element disposed underneath the transparent member and adjacent to the scan zone at a first end and disposed to extend over at least a portion of the media ramp at a second end; and
a second film element spaced apart from the first film element to form a channel there between, the second film disposed underneath the transparent member and adjacent to the scan zone at a first end and disposed to extend over at least a portion of the media ramp at a second end.

7. The imaging device of claim 6, further comprising:
a calibration label disposed over the scan zone and underneath the transparent member and disposed to extend over at least a portion of the media ramp, wherein the first end of the first film element and the first end of the second film element are disposed inside the calibration label.

8. The imaging device of claim 7, further comprising:
a third film element disposed inside the channel and spaced apart from the first film element and the second film element, the third film disposed adjacent to the scan zone at a first end and disposed to extend over at least a portion of the media ramp at a second end.

9. The imaging device of claim 6, further comprising:
a fourth film element disposed outside the channel and spaced apart from the first element and the second film element, the fourth film element disposed adjacent to the scan zone at a first end and disposed to extend over at least a portion of the media ramp at a second end.

10. The imaging device of claim 6, wherein the first film element and the second film element are composed of a biaxially-oriented polyethylene terephthalate.

11. An imaging device, comprising:
a scanner disposed in a scan zone to image a medium;
a transparent member disposed over the scan zone;
a media ramp disposed adjacent to the scan zone to direct the medium to an exit path of an automatic document feeder;
a first film element disposed underneath the transparent member and adjacent to the scan zone at a first end and disposed to extend over at least a portion of the media ramp at a second end;
a second film element spaced apart from the first film element to form a channel there between, the second film disposed underneath the transparent member and adjacent to the scan zone at a first end and disposed to extend over at least a portion of the media ramp at a second end; and
a calibration label disposed over the scan zone and underneath the transparent member and disposed to extend over at least a portion of the media ramp, the first end of the first film element and the first end of the second film element are disposed inside the calibration label.

12. The imaging device of claim 11, wherein the first film element and the second film element are composed of a biaxially-oriented polyethylene terephthalate.

13. The imaging device of claim 11, further comprising:
a third film element spaced apart from the first element and the second film element, the third film disposed underneath the transparent member and adjacent to the scan zone at a first end and disposed to extend over at least a portion of the media ramp at a second end.

14. The imaging device of claim 13, wherein the third film element is disposed in the channel to further define a first channel and a second channel.

15. The imaging device of claim 14, further comprising:
a fourth film element disposed outside the channel and spaced apart from the first element and the second film element, the fourth film element disposed underneath the transparent member and adjacent to the scan zone at a first end and disposed to extend over at least a portion of the media ramp at a second end.

* * * * *